United States Patent [19]

Kolb

[11] 4,336,845
[45] Jun. 29, 1982

[54] COMBINATION GARDEN TOOL

[75] Inventor: Walter Kolb, Betzdorf, Fed. Rep. of Germany

[73] Assignee: Wolf-Geräte GmbH, Fed. Rep. of Germany

[21] Appl. No.: 148,818

[22] Filed: May 12, 1980

[30] Foreign Application Priority Data

May 15, 1979 [DE] Fed. Rep. of Germany ... 7914049[U]

[51] Int. Cl.³ .......................... A01B 1/20; A01B 1/22
[52] U.S. Cl. ................................... 172/349; 172/375; 172/751
[58] Field of Search ................. 172/21, 136, 349, 350, 172/371, 372, 373, 374, 375, 749, 751; 56/400.04; 7/114

[56] References Cited

U.S. PATENT DOCUMENTS

| 109,657 | 11/1870 | Perrot et al. | 172/374 |
| 1,465,089 | 8/1923 | Parker | 56/400.04 |
| 1,699,933 | 1/1929 | Urban | 172/371 |
| 2,975,735 | 3/1961 | Purvance | 172/350 X |
| 3,340,937 | 9/1967 | Vanderveer | 172/350 |
| 4,197,918 | 4/1980 | Flippin | 172/749 X |

FOREIGN PATENT DOCUMENTS

| 1011203 | 6/1957 | Fed. Rep. of Germany | 172/349 |
| 759623 | 11/1933 | France | 172/375 |
| 89683 | 6/1921 | Switzerland | 172/375 |

Primary Examiner—Richard T. Stouffer
Attorney, Agent, or Firm—Ostrolenk, Faber, Gerb & Soffen

[57] ABSTRACT

A combination garden tool is disclosed. A first tool, which has a handle, and a second tool, which is secured to a coupling mechanism, are provided and are detachably coupled to each other in such a manner that both tools can be operated simultaneously. If desired, however, the second tool can be used alone while attached to the first tool. Preferably, the detachable coupling device includes a clamping bolt movable by means of eccentric supporting projections between a first and a second position to clamp the first tool is mounted to the body of the coupling device. The coupling device is preferably permanently secured to the second tool.

12 Claims, 6 Drawing Figures

COMBINATION GARDEN TOOL

BACKGROUND OF THE INVENTION

This invention relates to a combination garden tool including an oscillating weeder provided with a handle and having a finger-wheel roller at the rear of the tool.

Tools of this type are universal year around tools of diversified uses. Such a tool crumbles any soil to an extremely fine state, removes weeds and introduces peat and fertilizer. It serves for preparation of the soil for sowing and makes even heavy soils ready for sowing to uniform depth. Peat and fertilizer are also incorporated. This combination tool is well suited for the care of crops, since the oscillating cutter pulls out individual weeds and loosens them while the finger wheels can aerate the soil suitably between the rows of plants. In this connection the finger-wheel roller can also be used independently of the oscillating weeder by simply turning the handle 180° around its axis so that the weeder is raised from the ground.

SUMMARY OF THE INVENTION

The object of the present invention is to broaden the possibility of use of such combination garden tools and to create the possibility of having available, based on a single basic implement, a plurality of individual and combination tools.

This objective is achieved according to the invention by means of a first tool, e.g. an oscillatory weeder, mounted on a forked frame. An additional tool, such as a finger-wheel roller, is provided on a separate frame, which is adapted to be clamped to the weeder's forked frame. By unclamping the additional tool, it can be replaced with still another similarly mounted implement. By means of the detachable connection the result is obtained, on the one hand, that the oscillating weeder can also be used individually, separately from the finger-wheel roller, and the possibility is furthermore created of constructing, with such a weeder as basic tool, various combination tools including finger-wheel rollers, spike-tooth rollers, or other tools. In this way the result is obtained that only the tools need be kept available but not the supports or handles for them since one and the same support, preferably an oscillating weeder, can be used for all tools. In this way less space is required for storage and, of course, there is also obtained a lower cost for the overall combination. The detachable coupling is preferably developed as an eccentric coupling and is fastened on the support frame of the additional tool. The support tool, i.e. in particular the oscillating weeder, is provided with corresponding clamping surfaces so that a firm seat of the additional tool is assured without any large amount of force being required for the loosening or tightening of the connection.

The oscillating weeder is advantageous as support for attachment tools also for the reason that its tool, i.e. the cutter yoke is relatively light and its weight is not disturbing even if it is not used in a particular time. Thus both tools can be used simultaneously, or the attachment tool only is used.

For this the cutter yoke of the weeder can remain on the tool. However, it is also possible to arrange it in such a manner that the cutter yoke can be detached.

Since the quick-clamp coupling is connected in a secure manner with the corresponding attachment tool, it is not liable to being lost and is present when assembly is to be effected. On the other hand, the support tool, i.e. the weeder, is not weighted down by the weight of the quick coupler when the weeder is to be used by itself.

BRIEF DESCRIPTION OF THE DRAWINGS

Various embodiments of the invention will be described below with reference to the drawing in which.

DETAILED DESCRIPTION OF THE PREFERRED EMBODIMENT

Figure 1:
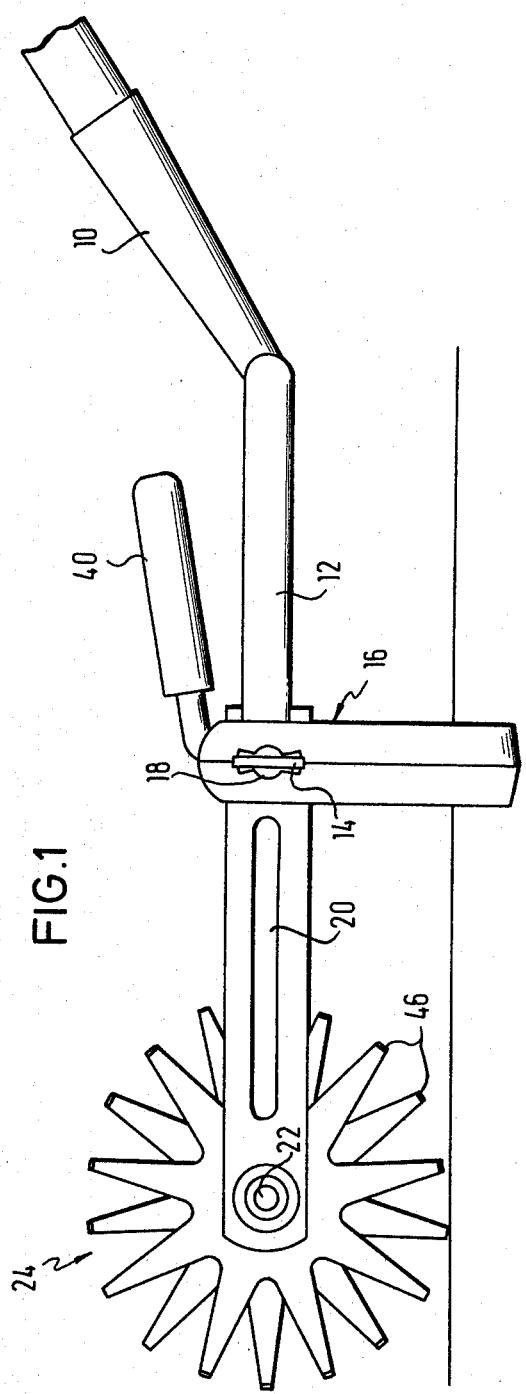
FIG. 1 is a side view of a finger-wheel roller connected with the oscillating weeder in accordance with the invention.

The basic part of the combination tool is formed by a weeder the construction of which is basically known. As shown in the Figures, it has a handle socket 10 for the insertion of a handle and on which there is welded a U-shaped yoke having two yoke arms 12. To the free ends of the yoke arms 12 there are welded flat iron bars 14 which are bent at a 90° angle. Over the outward extending ends of the flat irons 14 there are placed the two arms of a U-shaped cutter yoke 16 having the cutouts 18 visible in FIG. 1. Bars 14 protrude through cutouts 18. Cutouts 18 permit an oscillating movement of the yoke 16 with respect to the yoke arms 12, the cutter which forms the vertical arm of the yoke 16 carrying out a horizontal oscillating cutting motion.

Figure 2:
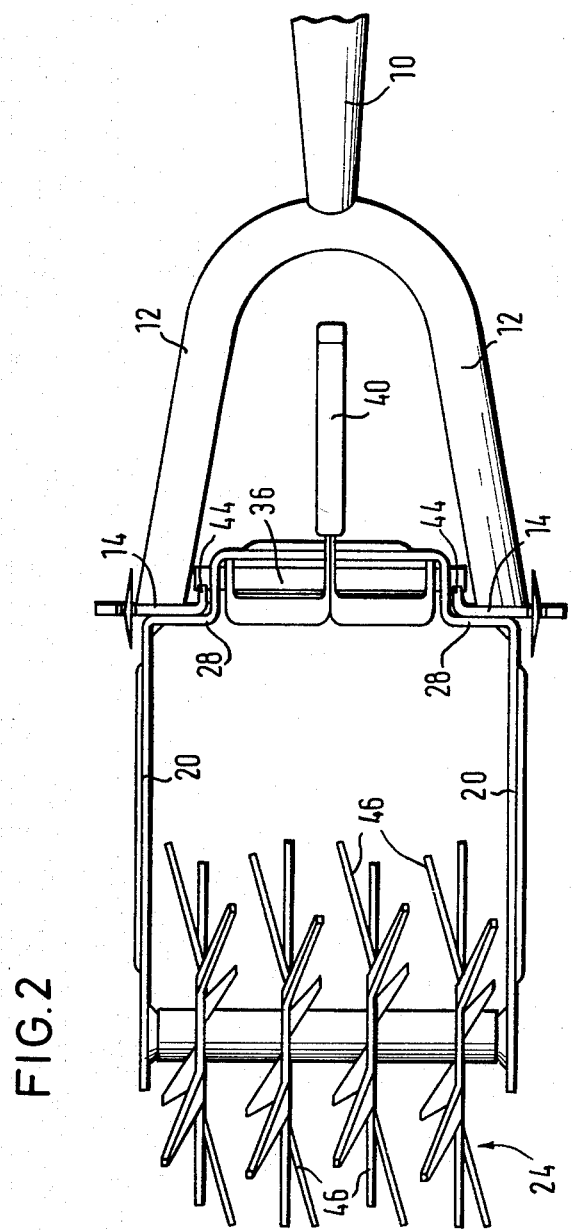
FIG. 2 is a top view of the combination garden tool shown in FIG. 1.
Figure 3:
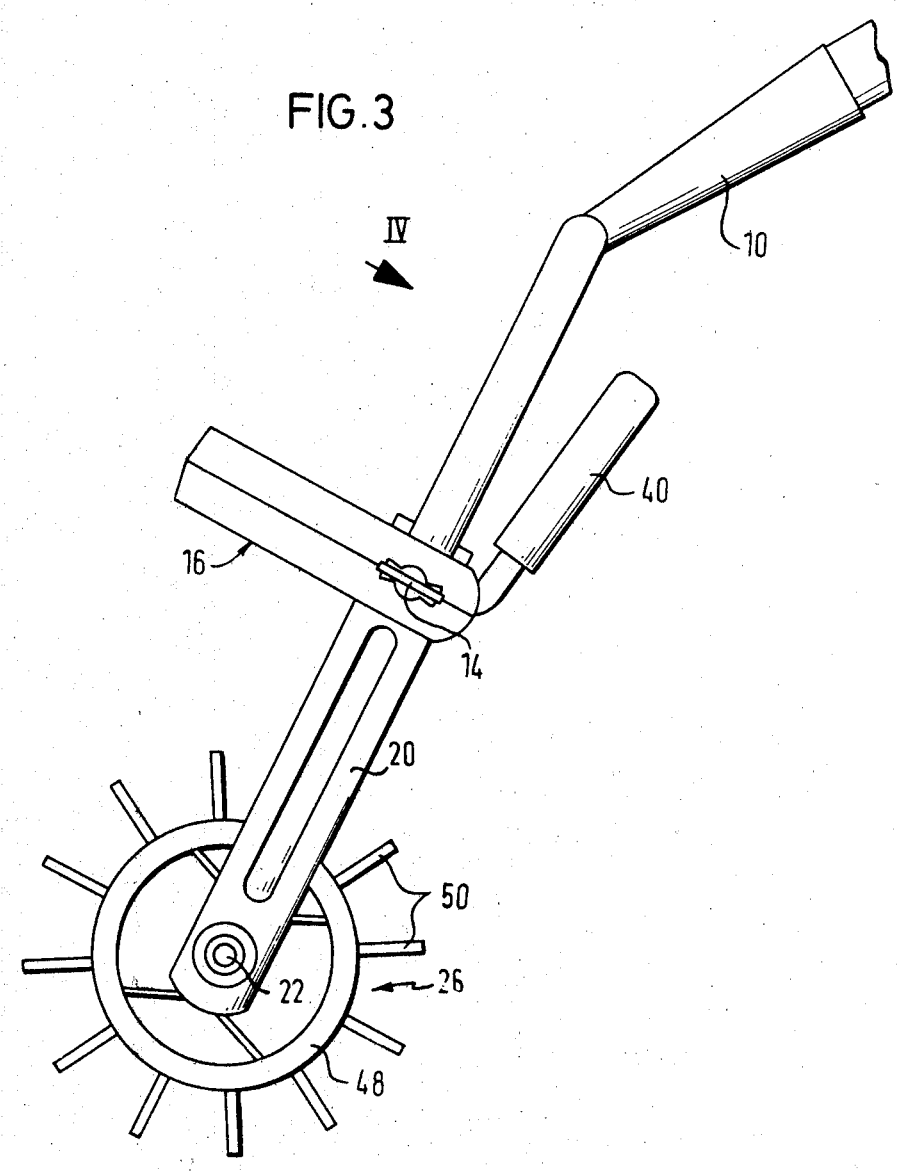
FIG. 3 is a side view of a spike-tooth roller connected with the weeder in accordance with the invention, shown in operating position.
Figure 4:
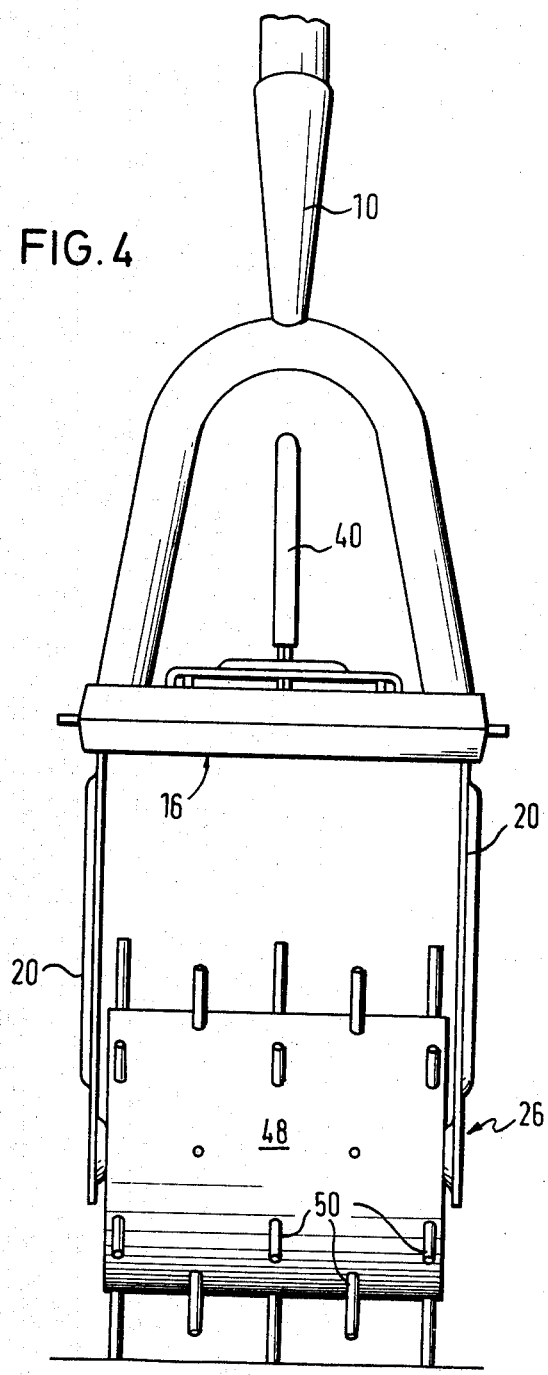
FIG. 4 is a view of the tool of FIG. 3 seen in the direction indicated by the arrow IV.
Figure 6:
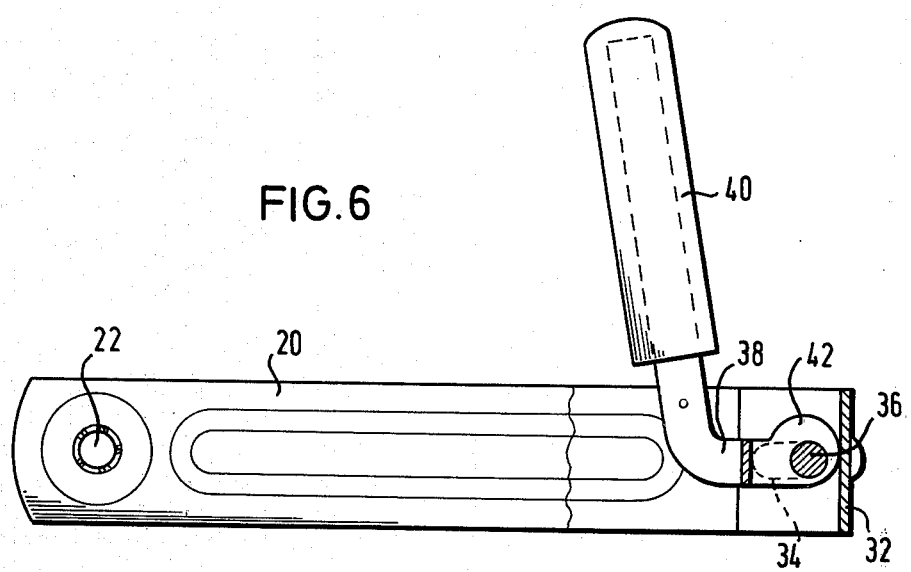
FIG. 6 is a sectional view of the frame part of FIG. 5, taken along the line VI—VI of FIG. 5.
Figure 5:
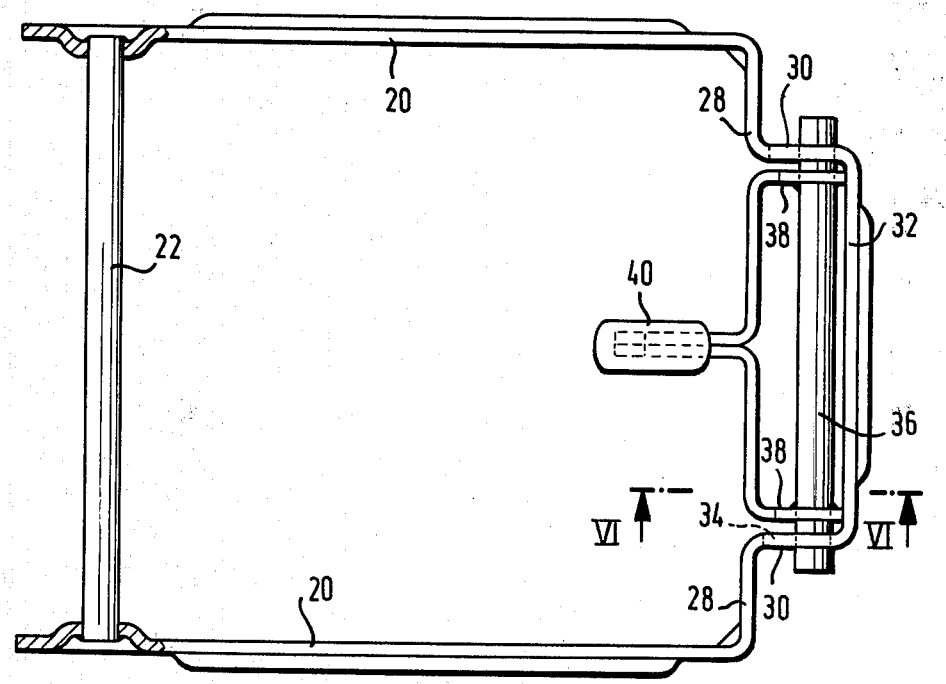
FIG. 5 is a top view of the frame part with quick-coupling device which is common to the finger-wheel roller of FIGS. 1 and 2 and the spike-tooth roller of FIGS. 3 and 4.

To this weeder there can be attached either a finger-wheel roller in accordance with FIGS. 1 and 2; a spike-tooth roller in accordance with FIGS. 3 and 4 or other tools to which the frame with clamping device shown in FIGS. 5 and 6 is common.

This frame has a generally U-shaped structural part, the free ends of whose supporting arms 20 bear the axle 22 for the finger-wheel roller 24 or spike-tooth roller 26. The arms of the frame-shaped yoke are provided with stiffening corrugations 27. The connecting piece of this frame yoke, i.e. the piece joining the arms 20, has two lateral sections 28 seated on the supporting arms 20 and a U-shaped bend, which is formed by the arms 30 (hereinafter called "inner arms") bent off from the sections 28 and a piece 32 which connects the inner arms 30. In the inner arms 30 there are formed slots 34 which receive the two ends of a bolt 36 which is welded to fork arms 38. Fork arms 38 are supported by a grip lever 40. Each of the fork arms 38 has a clamping projection 42 which is developed eccentrically with respect to the axis of the bolt 36 and which rests against the inside of the yoke piece 32. Upon the swinging of the grip lever 40 in the clockwise direction as seen in FIG. 6, the projection 42 rides on the piece 32 and due to the increasingly larger active diameter displaces the bolt 36 towards the left. As a result, as can be noted in particular from FIG. 2, a positive locking is produced. For this purpose the flat irons 14 of the weeder are so adapted to the yoke sections 28 that these irons 14 and pieces 28 can come flat against each other. Each flat iron is provided towards the inside with a right-angle bend 44, the end of which bend lies against the end of the bolt 36 protruding through the inner arm 30. Upon the swinging of the grip lever 40 in the clockwise direction as seen in FIG. 6, each of the flat irons 14 is therefore reliably clamped between the eccentric bolt 36 and the yoke sections 28, and by swinging the grip lever 40 in the counterclockwise direction as seen in FIG. 6 the detachment of the tool can be effected, if necessary, at any time.

The fork arms 12 are placed at such an angle with respect to the socket 10 that the combination tool of FIGS. 1 and 2 can operate with both tools simultaneously. This position of use is shown in FIG. 1. After turning the handle by 180°, turning the combination tool "upside down", the tool can, as shown in FIG. 3, also be used in the manner that only the finger-wheel roller or the spiked-tooth roller acts on the soil. In the same manner other tools can also be used in combination with the weeder 16 and connected to the latter by being connected to support arms 20.

One particular feature of the finger-wheel roller 24 shown in FIGS. 1 and 2 is that successive teeth 46 are in alternately bent towards the one side, towards the other side, and not bent at all, so that a penetration pattern of these teeth 46 which is completely uniform over width and length is obtained.

The spike-tooth roller 26 of FIGS. 3 and 4 to which has been made above, consists of a solid roller body 48 into which pins or spikes 50 are inserted radially.

In accordance with the embodiment shown and described above a weeder in the form of a U-shaped yoke suspended for oscillation is used as support for the various attachment tools. However, it is also possible to attach the attachment tools which is to another tool provided with corresponding clamping pieces and which bears a guide handle, for instance to an aerator, a cultivator or a similar tool.

What is claimed is:
1. A combination garden tool, comprising:
a first tool; a handle secured to said first tool;
a second tool; and
coupling means irremovably secured to said second tool for detachably coupling said second tool to said first tool in a manner such that both said tools can be used simultaneously and further such that at least said second tool can be used alone while said tools are secured to each other; said coupling means including a yoke frame having two support arms joined by a connecting piece and having an axle secured to said support arms and disposed between them; said second tool being mounted on said axle; said first tool being disposed between said handle and said coupling means, and said coupling means being disposed between said tools, when said tools are coupled by said coupling means;
said coupling means further comprises a clamping device secured to said connecting piece; a fork frame to which said first tool is secured; said fork frame includes two fork arms for being clamped to said connecting piece by means of said clamping device; respective flat pieces secured to the ends of said fork arms for cooperating with said clamping device to clamp said fork arms to said connecting piece;
said clamping device further comprises a clamping bolt rotatable between a first and a second position, said clamping bolt clamping said flat pieces against said connecting piece when in said first position, and said flat pieces not being clamped to said connecting piece when said clamping bolt is in said second position.

2. The garden tool of claim 1, wherein said clamping device further comprises eccentric supporting projections secured to said clamping bolt for causing said clamping bolt to move between said first and second positions as it is rotated.

3. The garden tool of claim 2, wherein said yoke frame has slots formed therein receiving the ends of said clamping bolt, said eccentric supporting projections cooperating with said connecting piece to cause said clamping bolt to move in said slot along the length of said slot as said clamping bolt is rotated.

4. The garden tool of claim 3, wherein said clamping device further comprises a grip handle secured to said clamping bolt for rotating said clamping bolt, thereby to move said clamping bolt between said first and second positions.

5. The garden tool of claim 4, wherein said clamping device further includes additional fork arms, said grip handle being secured to said clamping bolt by means of said additional fork arms; each said additional fork arm being continuous and integral with a respective said eccentric supporting projection.

6. The garden tool of claim 1, wherein each said flat piece has a right-angle bend formed therein defining a longer and a shorter leg of the respective said flat piece, said short leg of each said flat piece engaging said clamping bolt when said clamping bolt is in said first position.

7. The garden tool of claim 1, wherein said first tool is an oscillatory weeder.

8. The garden tool of claim 1, wherein said second tool is a finger-wheel roller.

9. The garden tool of claim 8, wherein said finger-wheel roller has a plurality of finger wheels with laterally bent teeth.

10. The garden tool of claim 9, wherein adjacent said teeth of each said finger wheel are bent according to such a pattern as to cause said second tool to produce a uniform perforation pattern.

11. The garden tool of claim 1, wherein said second tool is a spike-tooth roller.

12. The garden tool of claim 11, wherein said spike-tooth roller includes a solid roller body having a plurality of spikes inserted therein, said spikes being arranged in staggered rows.

* * * * *